Aug. 26, 1941.                P. J. McCULLOUGH                2,253,637
TOASTING MACHINE
Filed Jan. 27, 1939                3 Sheets-Sheet 3

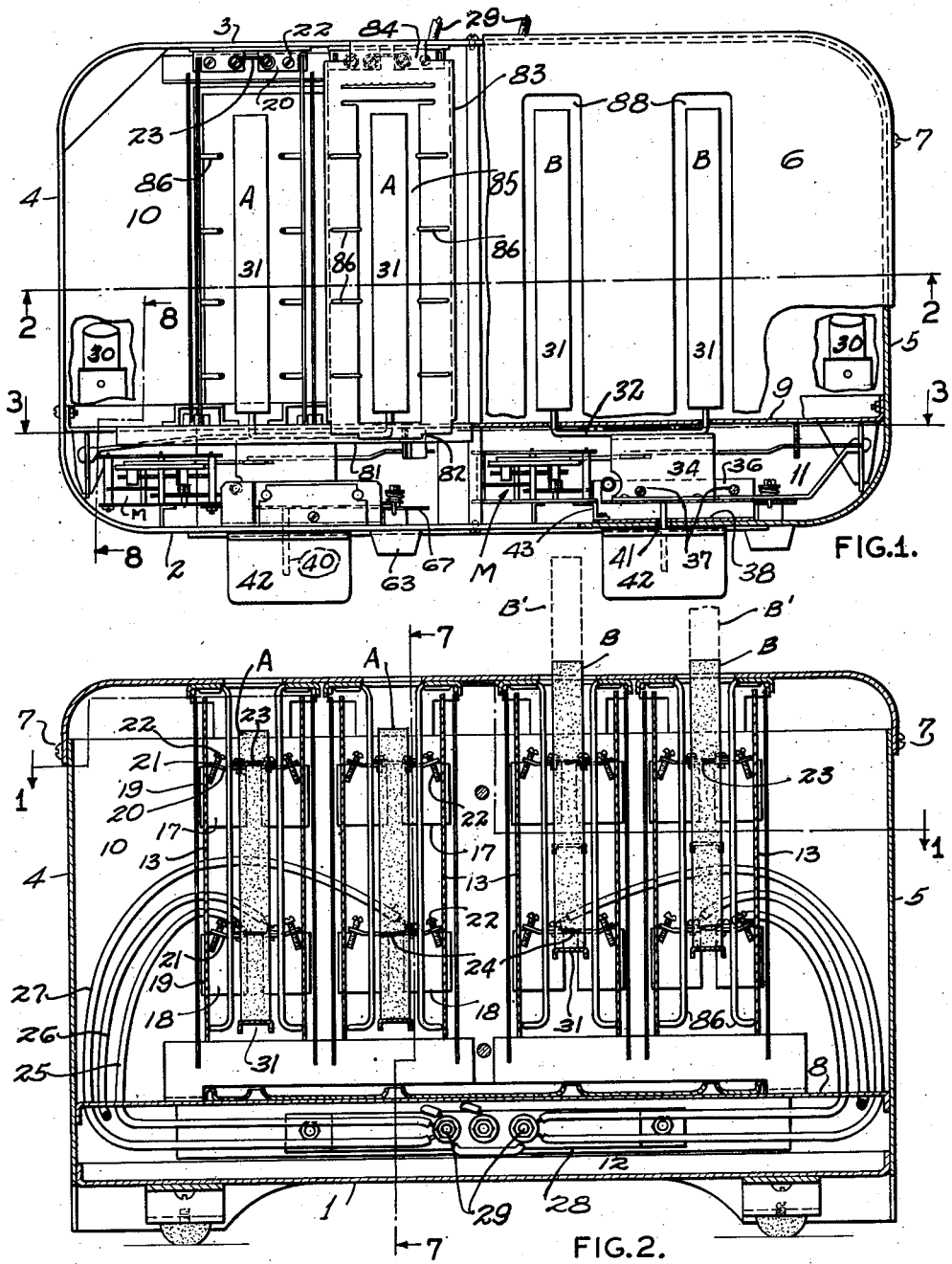

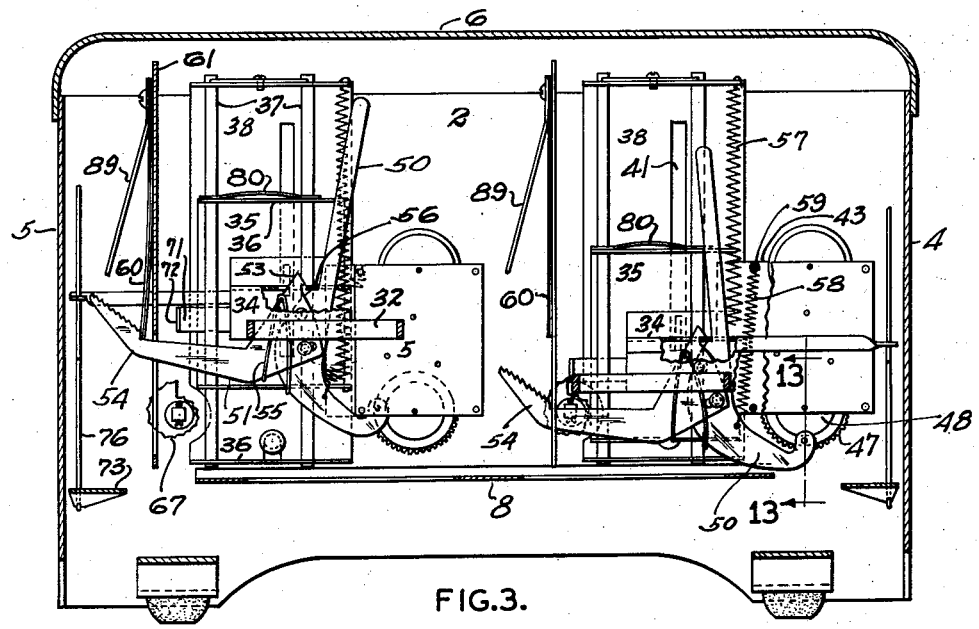

INVENTOR
PAUL J. McCULLOUGH
BY Rodney Bedell
ATTORNEY

Patented Aug. 26, 1941

2,253,637

UNITED STATES PATENT OFFICE 2,253,637

TOASTING MACHINE

Paul J. McCullough, St. Louis, Mo., assignor to Joseph Pavelka, St. Louis, Mo.

Application January 27, 1939, Serial No. 253,043

12 Claims. (Cl. 219—19)

The invention relates to bread toasters or like devices and consists of all the novel structure hereinafter described and illustrated in the accompanying drawings of an electric toaster, particularly adapted for use in restaurants, although not limited to such use.

One of the objects of the invention is to move the bread slice from an initial retracted position slowly throughout the toasting period and towards a terminal projected position in which a portion of the slice will be projected from the toaster. Preferably the latter portion of this movement of the slice will be rapid, and preferably the device includes an indicator movable exteriorly of the device throughout the toasting period and with the slice carrier so that the user may observe at a glance the position of the carrier and the corresponding condition of the slice being toasted.

Another object of the invention is to cushion the terminal movement of the slice carrier to its projected position to reduce noise and to prevent the slice thereon from being completely ejected from the toaster.

Another object of the invention is to close the circuit for the electric heating elements by the movement of said carrier to retracted position and to open the heater circuit by movement of said carrier to projected position.

The device includes a timing mechanism and it is another object of the invention to energize and set the timing mechanism by the user's act of moving the slice carrier from its projected position to its initial retracted position.

Another object of the invention is to utilize the same spring device for moving the slice carrier from its retracted position to its projected position and for energizing the timing mechanism.

Another object of the invention is to provide for uniform action of the timing mechanism throughout the toasting operation by combining a tension spring and lever whereby the effective arm of the lever is reduced when the spring is placed under maximum tension and the effective arm of the lever is increased as the tension on the spring is decreased.

Another object of the invention is to provide in a carrier-setting timer-energizing combination as described above, means for terminating the toasting operation and lifting the toast for inspection position at any time during the operation.

Another object of the invention is to vary the movement of the slice carrier towards its retracted position and thereby change the toasting period to produce light or dark toast with either white or rye bread.

Another object of the invention is to vary the duration of the toasting operation in a structure described above by a thermostatic control which will function according to variations in the temperature of the heating chamber near the end of the toasting operation and without placing any bending load on the thermostatic member.

An additional object is to arrange the thermostatic control so that successive slices of toast will be uniform whether or not one of the operations is started when the toaster is cold and another operation is started when the toaster is heated from a preceding operation.

Another object of the invention is to toast the slice uniformly and to avoid the "streaking" of the same by the positioning rods usually located between the slice and the heating element.

Another object of the invention is to facilitate the removal and replacement of the heating elements by rendering members for position and contacting the heating elements readily accessible from an open side of the heating chamber when the top wall normally closing that side of the member is removed.

In the accompanying drawings, illustrating a select embodiment of the invention, Figure 1 is in part a top view of a four slice bread toaster, a portion of the top wall being broken away, and in part a horizontal section taken approximately on the line 1—1 of Figure 2.

Figures 2 and 3 are vertical, longitudinal sections taken on lines 2—2 and 3—3 respectively of Figure 1.

Figures 4 and 5 are sections corresponding to the left hand end of Figure 3 but showing the parts in different positions.

Figure 6 is a detail transverse section taken on the line 6—6 of Figure 5.

Figure 7:
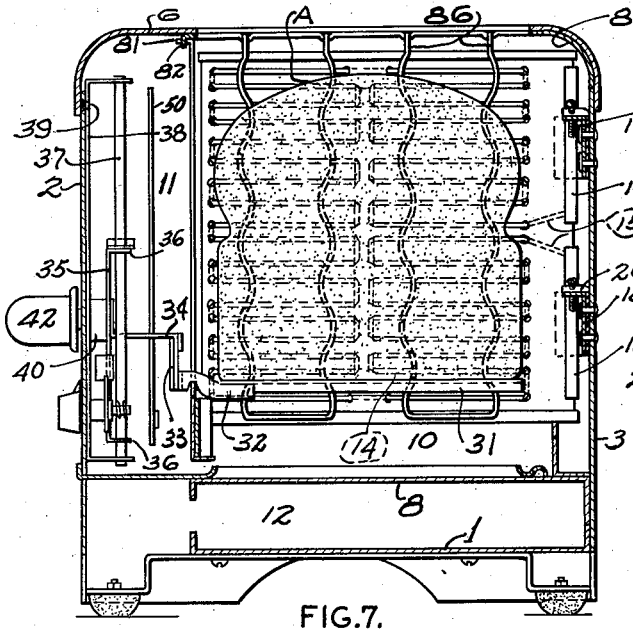
Figure 7 is a vertical transverse section taken on the line 7—7 of Figure 2.

The body of the toaster comprises a housing or casing having a bottom wall 1, front wall 2, rear wall 3, end walls 4 and 5 and a top wall 6 which is readily removable by detaching screws 7. The body also includes a horizontal partition 8 and an upright longitudinal partition 9 which cooperate with casing walls to form a heating chamber 10, a mechanism chamber 11 and a wiring and switch chamber 12.

A plurality of heating elements 13 extend transversely and vertically of the heating chamber and are arranged in pairs. Each of these heating elements is a plate-like formation comprising one or more sheets of mica with a continuous strip of resistance metal 14 (Fig. 7) having its ends 15 in contact with elongated terminal strips 16 extending along one vertical edge of the mica sheet and insulated from each other. Adjacent one end of each heating element is a pair of brackets 17 and 18 respectively (Figs. 1, 2 and 7), one above the other, mounted upon but insulated from the toaster rear wall 3 and each having a vertical flange 19 extending inwardly from the casing wall and forming a bearing for one side of the heating element. Each bracket also includes a horizontal flange 20 with its end 21 nearest the heating element inclined slightly from the horizontal and apertured and threaded to receive a screw 22 which may be advanced until its lower end contacts one of the bars 16 and clamps the same against bracket flange 19.

Wires 23 connect adjacent brackets 17 on each pair of elements for one slice of toast and wires 24 connect a bracket 18 of an element for one slice of toast with an adjacent bracket 18 of an element for another slice of toast. Wires 25, 26 and 27 extend from respective brackets 18 downwardly into wiring chamber 12 where they are connected to bus bars 28 having terminals 29 extending through casing rear wall 3.

The heaters and wiring therefor are shown as arranged in two groups of four heaters, each group having an individual circuit and switch 30. Each group will accommodate two slices of bread as indicated at A, A and B, B, respectively.

Each bread slice is supported upon an individual carrier 31 arranged between a corresponding pair of heaters 13 and movable vertically from the retracted position shown at the left hand end of Fig. 2 to the elevated position shown in full line at the right hand end of Fig. 2, or to a projected position indicated in dash lines at the right hand end of Fig. 2.

The carriers 31 of each pair are mounted upon a U-shaped strap 32, the cross bar of which is secured to a vertical leg 33 of a bracket 34 mounted on an upright slide 35 having inturned flanges 36 at top and bottom, apertured to receive and slide over upright rods 37 mounted on a plate frame 38 secured to the casing front wall 2 by detachable screws 39. An extension 40 on slide 35 passes through vertical slots 41 and 41a (Figs. 1 and 3) in casing front wall 2 and plate 38 respectively and mounts a handle 42 whereby slide 35 and the carriers 31 may be moved manually as described below. Slot 41 extends to the top of front wall 2. Slot 41a terminates at points spaced from the edges of plate 38.

Carried by each plate 38 is a bracket 43 mounting a clock-work mechanism indicated at M (Figs. 1, 4 and 13) and including an escapement 44, a ratchet wheel 45 therefor, reducing gears and cogs 46 and a driven gear 47 adapted to be actuated by a friction disc 48. A crank 49 on disc 48 provides a connection for the lower end of an L-shaped arm 50 (Figs. 3 and 4) the upright leg of which passes through a slot in bracket 34. A detent 51 is pivoted on arm 50 at 52 and has a hook 53, and a tail 54. A spring 55 yieldingly thrusts detent 51 in a clockwise direction. When handle 42, slide 35, bracket 34 and carriers 31 are moved downwardly bracket 34 strikes upwardly facing shoulder 56 on arm 50 and further downward movement on handle 42 forces disc 48 in an anti-clockwise direction. As bracket 34 strikes shoulder 56 detent hook 53 passes through a slot therefor in bracket 34 and moves to the right to engage the top face of bracket 34 whereby bracket 34 and the parts associated therewith are held against upward movement except as permitted by the clockwise movement of disc 48 or unless bracket 34 is released from detent hook 53 by the anticlockwise movement of detent 51 about its pivot 52.

A long coil spring 57 has one end anchored to the upper end of plate 38 and its lower end secured to the lower flange 36 on slide 35. A relatively short coil spring 58 has its upper end anchored to a pin 59 on clock-work bracket 43 and has its lower end secured to the lower portion of arm 50.

When handle 42 is moved downwardly as described above, spring 57 is stretched until bracket 34 engages shoulder 56 and further downward movement of handle 42, bracket 34 and arm 50 rotates disc 48 and stretches both of springs 57 and 58 and both these springs co-operate to energize the clock-work mechanism M and also yieldingly thrust slide 35, and the parts carried thereby, and the toast slice upwardly.

As the springs function to move arm 50, bracket 34, etc. upwardly, from the position shown at the right hand end of Fig. 3, as fast as the clock-work escapement permits, the tail 54 of detent 51 approaches the lower end of a thermostat bar 60, the upper end of which is secured to the outwardly projecting leg of an angle 61 mounted on partition plate 9, and slotted at 62 to receive detent tail 54. When the latter engages the thermostat (left hand end of Fig. 3), further upward movement of arm 50 tilts detent 51 on its pivot 52 to release bracket 34 from detent hook 53 and the bracket is free to move upwardly under the thrust of spring 57 only to the position shown in Fig. 4 and in broken lines at the right hand end of Fig. 2, in which position the toast will be projected above the top of the casing as indicated at B'. Spring 58 may continue to actuate the clock mechanism until arm 50 is in its normal position shown in Figure 4, but this operation is immaterial and does not affect the slice carrier 31.

The left hand end of Fig. 3 shows thermostat 60 in the position it assumes when relatively cool, e. g. during an initial toasting operation following a period of non use of the toaster. Accordingly the arm, detent and parts associated therewith will have a maximum travel upwardly before the thermostat functions to trip the detent and release bracket 34 and the carriers mounted thereon.

As the entire interior of the toaster heats up, thermostat 60 will move to the left until it reaches a maximum distorted position as indicated in Fig. 5 in which position the outer end of the upwardly inclined detent tail 54 will engage the lower end of the thermostat much sooner than it would if the thermostat was cool, thereby shortening the toasting period and tending to maintain a uniform degree of crispness in successive slices of toast. The thrust of the detent tail against the thermostat is lengthwise of the latter, hence there is no tendency of this thrust to bend the thermostat transversely of its length and the position of the thermostat will be determined exclusively by its temperature.

It will be understood that the variation in the toasting period effected by the thermostat, as described above, is an automatic variation for the purpose of producing uniformly toasted slices irrespective of differences in the initial temperature of the interior of the toaster. It is desirable also to provide for varying the toasting period manually to produce light or dark toast. Also, when the toaster is set for a certain degree of crispness of toast, it is desirable to adjust the machine readily to produce the same quality of toast from a different kind of bread, e. g. if the toaster is set to obtain a certain quality of toast from white bread, a simple adjustment will produce the same quality of toast from rye or whole wheat bread although this requires a variation in the toasting period.

Figure 11:
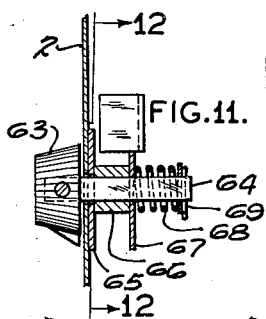
Figure 11 is a detail vertical transverse section taken on the line 11—11 of Figure 10.
Figure 12:
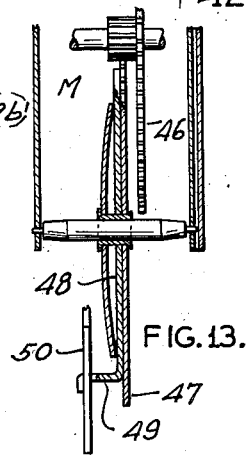
Figure 12 is a detail longitudinal vertical section taken on the line 12—12 of Figure 11.

These variations are obtained by manipulating the knob 63 secured to a shaft 64, journalled in the casing front wall 2 and mounting a washer 65, a spacer 66, a cam 67, a spring 68 and a cotter 69. (Fig. 11). Shaft 64 is square and fits snugly in a square hole in cam 67. Washer 65 has a square hole 70 receiving shaft 64 but not fitting the same closely (Fig. 12). Spring 68 creates sufficient friction between knob 63 and wall 2 and between spacer 66 and washer 65 to yieldingly retain knob 63 and shaft 64 in any position to which it may be set. With slight effort the knob and shaft may be turned to the extent permitted by the loose play between shaft 64 and washer 65, the latter remaining stationary, but as soon as this loose play is taken up, noticeably additional effort will be required to turn the shaft 64 and washer 65 due to the increased friction between washer 65 and wall 2.

The adjustment functions by limiting the downward movement of slide 35. An arm 71 fixed on slide 35 has a lip 72 disposed in a plane extending transversely of the plane of cam 67 so that lip 72 strikes the upper edge of cam 67 as handle 42 and the parts movable thereby are moved downwardly. Obviously when handle 42 is depressed to the maximum extent provided when low point 67a of the cam is uppermost, then the carrier will have the maximum upward travel under the restraint of the clock-work mechanism and when the cam is turned to bring its high point 67b into position to engage lip 72, then the extent of upward travel and the time required therefor before the detent is tripped will be shortened. Knob 63 may be shifted until its pointer indicates the degree of toast desired to be produced from one kind of bread, e. g. white bread. If, at any time, it is desired to produce toast of the same crispness from a variety of bread requiring more cooking than white bread, such as rye or whole wheat, the operator may readily adjust cam 67 for the other variety of bread by turning the same to the extent provided by the play of shaft 64 in hole 70. This play is readily determined by the touch due to the difference in frictional resistance to the movement of shaft 64, cam 67 and spacer 66 and the resistance of the movement of these elements with washer 65.

Figure 8:
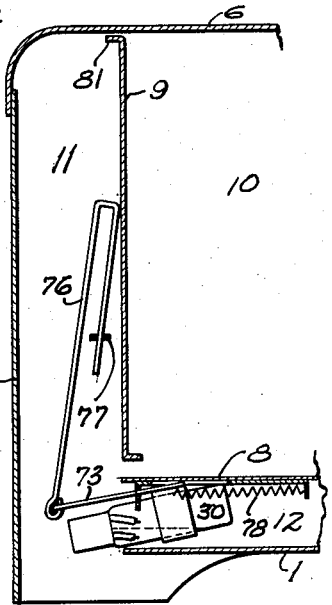
Figure 8 is a detail transverse vertical section taken on the line 8—8 of Figure 1.
Figure 9:
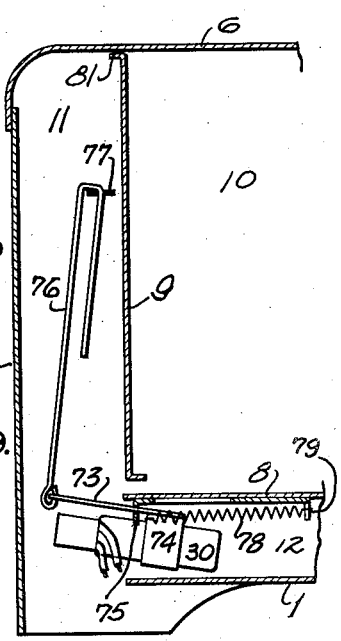
Figure 9 is a similar section showing the parts in different position.

It is desired to operate the heater circuit switch by the movement of the carrier to toasting position. To this end the switch 30 (Figs. 1, 8 and 9) is spring actuated to circuit closing position and is positively moved to circuit opening position when the slice carrier is elevated. Switch 30 is of a familiar mercury tube type in which a pair of terminals (not shown) are flooded when the tube is tilted as shown in Figure 8 and are bared when the tube is tilted as shown in Figure 9. The tube mounting comprises a plate 73 having a clip 74 embracing the switch tube. Plate 73 is pivoted on a bracket 75 on horizontal partition wall 8 and its outer end has a lost motion connection 76 to an arm 77 extending laterally from slide 35. A coil spring 78 has one end attached to plate 73 and the other end anchored to lug 79 on bracket 78. The tension of spring 78 may be varied by inserting a coil over lug 79.

When the slice carrier and slide 35 are moved downwardly, spring 78 pulls plate 73 in an anticlockwise direction to close the switch. As the slice carrier and slide 35 moves upwardly arm 77 slides along link 76 throughout the toasting operation. Upon tripping of detent 51 and the movement of the carrier and slide 35 to toast projecting position, arm 77 engages the upper end of link 76 and tilts switch 30 to circuit opening position. This movement is resisted somewhat by the tension of spring 78 and accordingly the latter serves as a snubber for the upward movement of the slice carrier. A flat bowed spring 80 is positioned between top flange 36 on slide 35 and the top flange of plate 38. Spring 80 acts as a buffer to cushion the end of the upward movement of slide 35.

The upper end of partition wall 9 is flanged outwardly as indicated at 81 and slotted at 82. Individual plates 83 extend across the heating chamber above each carrier 31, with one end of each tongued to enter slot 82, and with the other end curved downwardly as shown at 84 and resting upon the upper edge of rear wall 3. Each plate 83 has an elongated slot 85 providing for the passage of bread or toast slice therethrough. Suspended from each plate 83 at opposite sides of the slice carrier are a plurality of U-shaped wire guards 86 functioning in a well known manner to hold the slice spaced from the heating elements. Wires 86 are corrugated in a plane paralleling the plane of the adjacent plate-like heating element 13 and the path of movement of the bread slice. As the slice moves upwardly slowly during the toasting operation every part of the slice is exposed to the radiant heat from elements 13 and this eliminates the white streaks in the finished toast such as result from the usual straight wire guards in general use.

The construction described in the preceding paragraph and in the two paragraphs following the brief description of the figures facilitate the removal and replacement of the heating elements. Upon removing screws 7, top wall 6 may be removed from the body of the toaster and plates 83, with the guard wires 86 suspended therefrom, may be lifted out of the toaster. This exposes the inclined screws 22 which secure heating elements 13 in position and provide contacts for the terminals 16 of the resistance strips 14. Upon loosening a pair of upper and lower screws 22 the corresponding heater element may be removed from the toaster and a new one inserted.

Similarly the construction of each carrier mounting and timing unit provides for the ready removal of the same from the toaster for repair or replacement. Each plate 38 is retained by countersunk screws 39, the heads of which are exposed upon the removal of top plate 6. Upon unscrewing screws 39 and detaching switch link 76, plate 38 and all of the parts mounted thereon including carrier bracket 34, slide 35, mechanism bracket 43, arm 50 and detent 51 are removable as a unit and may be readily inspected, repaired and replaced.

Figure 10:
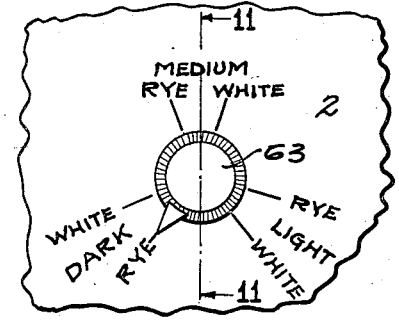
Figure 10 is a detail elevation of a portion of the front of the machine illustrating the adjustment control and drawn on an enlarged scale.
Figure 13:
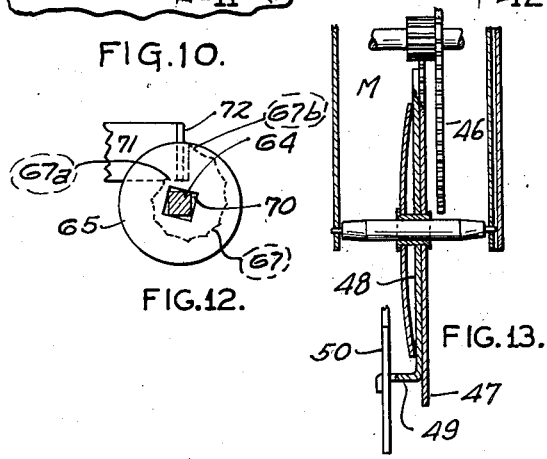
Figure 13 is a detail transverse vertical section taken on the line 13—13 of Figure 3 and drawn on an enlarged scale.

*Operation.*—Assuming the toaster to be cold and that it is desired to produce one or more slices of well done rye toast, the user inserts the required number of slices through the slots 88 in top cover plate 6 so that they rest upon carriers 31 and turns the knob or knobs 61 to the position indicated in Figure 10. (To simplify the description, reference will now be made to a single unit only.) The handle 42 is then depressed as far as possible, i. e. until lip 72 strikes the upwardly facing edge of cam 67. (Figs. 11 and 12.) This movement of handle 42 has permitted switch spring 78 to tilt mercury tube 30 to close the heater circuit (Fig. 8) and has tensed springs 57 and 58 and has thrust arm 50 downwardly with its lower end moving to the right and sliding friction plate 48 over wheel 47. (Fig. 3, right hand, and Fig. 13.) Detent hook 53 has passed through the slot therefor in bracket 34 and has engaged the top face of the bracket.

Upon release of handle 42, springs 57 and 58 pull slide 35 upwardly (but the movement of the slide is restrained by the clock-work mechanism) until detent tail 54 strikes the lower end of thermostat 60 (Fig. 3, left hand) and bracket 34 is released from the escapement mechanism. All of the parts being cold at the beginning of the operation, thermostat 60 will have distorted but little and its lower end will oppose the lowermost part of detent tail 54 thereby providing for the maximum period clock-restrained movement of slide 35, carriers 31 and the slice thereon. At this point the connection between spring 57 and the clockwork mechanism is broken and spring 57 raises slide 35 unrestrained, except by the weight of the parts and the toast, until as slide 35 reaches the upper end of its movement, arm 77 engages switch link 76 to open the circuit and switch spring 78 dampens the upward movement of the slide and its load. The final upwardly movement of slide 35 (Fig. 4) is cushioned by spring 80 striking the upper flange on plate 38. This snubbing and cushioning action prevents the complete ejection of the bread and reduces shock and noise which would result otherwise.

Throughout the toasting operation the operator has been able to determine its progress by observing the height of handle 42 as it moves slowly upward. Irrespective of such observation the completion of the toasting operation is rendered obvious by the projection of the upper end of the slice above top wall 6 as indicated at B' (Fig. 2). These features are particularly advantageous in a restaurant toaster where the waiter has numerous duties requiring attention and can carry on these duties without stopping to open a toaster or lift a carriage to inspect the toast.

Nothwithstanding the automatic termination of the toasting operation in accordance with a pre-determined setting, the toasting operation may be terminated at any time by simple manual elevation of handle 42 and the toast may be removed, or inspected and left in the toaster to be kept warm, or the handle may again be depressed and toasting resumed.

Upon successive toasting operations and dependent upon the room temperature, the rapidity of repeated toasting operations, and the length of the preceding toasting operation, thermostat 60 will deflect to engage detent tail 54 at different points along its upper edge and at different times after the starting of the toasting operation (Fig. 5), hence successive slices of toast will be uniformly cooked unless the toasting operation is interrupted by the manual lifting of handle 42 or by re-adjusting knob 61 and its cam 67 to vary the extent of the downward movement of handle 42 and slide 35 to shorten the return movement under the control of the clock-work escapement mechanism. The maximum deflection of the thermostat is limited by a stop 89 which prevents the thermostat from moving so far as to completely disaline with the detent tail 54.

It will be understood that many of the details of the structure may be varied substantially from the particular disclosure and description herein and some of the features may be omitted without affecting the use of the remaining features, e. g. the switch control may be combined with a high and low heat switch as illustrated in McCullough and Pavelka Patent No. 2,112,422 instead of with a switch which merely opens and closes the circuit as shown herein. The exclusive use of all features of the invention covered by the claims is contemplated irrespective of these and other modifications as will be suggested to those familiar with the art.

What is claimed is:

1. In a bread toaster, a heating element, a switch controlling the circuit supplying current to said element, a spring normally thrusting said switch to circuit closing position, a slice carrier, mechanism for moving said carrier slowly during the toasting operation from a toasting position towards a position in which a slice on the carrier will be projected from the toaster casing, and for moving said carrier rapidly at the end of the toasting operation to said slice projected position, there being a connection between said carrier and said switch whereby the movement of said carrier to the toasting position closes said switch and the movement of said carrier to the slice projecting position opens said switch and is yieldingly restrained by said switch spring.

2. In a bread toaster, a heating element, a switch controlling the circuit supplying current to said element and comprising a mercury tube a pivotal mounting for said tube, said tube having terminals flooded or bared by the mercury as the tube is tilted to on or off position, a spring normally tilting said switch to circuit closing position, a movable unit including a slice carrier mechanism for moving said unit slowly during the toasting operation from an initial toasting position towards a position in which a slice or said carrier will project from the toaster, and at the end of the toasting operation, moving said unit rapidly to said slice projecting position there being a lost motion connection between said unit and said tube mounting whereby the slow movement of said unit during the toasting operation does not tilt said tube but the rapid movement of said unit to slice projecting posi tion tilts said tube while said spring yieldingly resists such tilting and thereby snubs the final movement of said unit.

3. In a device of the class described, a clockwork escapement mechanism including a disk, an arm connected to said disk, a unit including a slice carrier, movable from a retracted toasting position, in which a slice on said carrier is enclosed in said casing, to a projected position in which the slice protrudes from said casing, a connection between said unit and said arm whereby said spring also energizes said mechanism, said unit and arm moving tangentially to said disk during the toasting operation whereby as said spring shortens and its tension decreases, the leverage exerted against said disk by said arm is increased to provide substantially uniform thrust on said mechanism.

4. In a bread toaster, a casing including a toasting chamber, a slice carrier movable from a retracted toasting position, in which a slice thereon is enclosed in said casing, to a projected position in which this slice protrudes from said casing, a clock-work escapement mechanism for timing the toasting operation, a plurality of springs for actuating said mechanism and for moving said carrier towards said projected position, means for freeing said carrier from said mechanism at a point intermediate said positions and at the end of the toasting operation, the tension on one of said springs being relieved at the end of the toasting operation and the other spring then moving the carrier to said projected position free of the resistance of the timing mechanism.

5. In a bread toaster, an outer casing with bottom, side and top walls, said top wall being easily removable from the remainder of said casing, an upright partition wall in said casing forming therein a toasting chamber and a deep narrow mechanism chamber adjacent said toasting chamber, and a unit comprising a frame and timing mechanism positioned in said narrow chamber and an extension thereon projecting to said toasting chamber and forming a slice carrier therein, and an extension on said timing member projecting through the adjacent casing side wall and mounting a manually operable handle at the exterior of said side wall, said casing side wall and said partition wall having vertical slots for said extensions, the slot in said casing wall having an open upper end, and said unit frame having detachable means securing the same to said side wall whereby said unit, carrier and handle may be removed upwardly from said casing upon the removal of said top wall and said means.

6. In a bread toaster, an outer casing with bottom, side and top walls, said top wall being easily removable from the remainder of said casing, an upright partition wall in said casing forming therein a toasting chamber and a deep narrow mechanism chamber adjacent said toasting chamber, a plate secured in said mechanism chamber, a bracket slidably mounted on said plate, a slice carrier on said bracket and movable therewith and projecting into said toasting chamber, a spring secured to said plate and to said bracket for moving the latter in one direction, a handle on said plate and projecting outwardly of said casing for moving said bracket and carrier in the other direction, a clock-work escapement device mounted on said plate, a connection between said device and said bracket including a detent, and means for releasing said bracket from said detent when said bracket has moved a pre-determined distance under the influence of said spring as controlled by said device, said plate, bracket, carrier, spring, handle, device and detent comprising a single unit readily removable from said mechanism chamber upon the removal of said top plate.

7. In a bread toaster, a slice carrier, mechanism for moving said carrier from an initial toasting position to a terminal position in which a slice thereon projects from the toaster, the period of such movement depending upon the distance between said initial and terminal positions of said carrier, a manually operable member for moving said carrier to an initial toasting position, and an adjustable stop device for limiting such manual movement of said carrier to initial toasting position and thereby controlling the toasting period and crispness of the toast, said stop device being mounted upon a toaster wall and comprising a non-circular shaft, a large diameter washer with a non-circular hole loosely surrounding said shaft, a relatively small diameter sleeve fitting said shaft, a spring thrusting said sleeve against said washer and said washer against the inner face of said wall, a cam on said shaft for engaging a part movable with said carrier, and a knob on said shaft exteriorly of said wall, whereby the shaft, sleeve and cam may be turned relatively freely in said washer, to effect a slight adjustment of said cam, and may be turned with said washer upon overcoming relatively greater frictional resistance to effect a more substantial adjustment of said cam.

8. In a bread toaster, a heating chamber, a unit including a slice carrier, means for moving said unit from a position in which it initiates the toasting operation to a position in which it terminates the toasting operation, a clock work escapement mechanism for prolonging the movement of said unit and the toasting period and including a detent movable with said unit and connecting same to said mechanism and having an arm extending transversely of but inclined to the line of movement of said unit, and an element positioned to be engaged by said arm to trip said detent and thereby free said unit from said escapement mechanism, said element being movable to different positions to engage said inclined arm at different points in its travel and thereby vary the toasting period.

9. A toaster as described in claim 8 in which the tripping element comprises a thermostat movable by the heat of the toaster to vary the point of its engagement with the detent arm and the length of the toasting period.

10. A toaster as described in claim 8 in which the tripping element comprises an elongated thermostatic bar extending in the general direction of the movement of the unit and having the end remote from the detent arm fixed and the end opposing the detent arm movable lengthwise of the same about the other end of a pivot as the bar is deformed by the heat of the toaster.

11. In a bread toaster, a housing, a slice carrier therein, a clockwork timing mechanism, a releasable connection between said carrier and mechanism, said carrier being movable manually from a projected position, in which a bread slice on said carrier would protrude from said housing to a retracted toasting position in which the bread slice would be enclosed in said housing, a spring secured to said carrier independently of said mechanism, a spring secured to said connection, both of said springs being distorted by manual movement of said carrier to retracted position and thereupon cooperating to actuate said clock mechanism and to return said carrier slowly towards its projected position, and means for releasing said connection after a predetermined period and permitting said first mentioned spring only to move said carrier quickly to its projected position.

12. In a bread toaster, a housing, a slice carrier therein, a clockwork timing mechanism, said carrier being movable manually from a projected position, in which a bread slice on said carrier would protrude from said housing to a retracted toasting position in which the bread slice would be enclosed in said housing, spring means secured to said carrier and distorted by manual movement of said carrier to retracted position, a releasable connection between said carrier and mechanism engaged by movement of said carrier to retracted position whereby said spring means then moves said carrier slowly towards projected position under the restraint of said mechanism, and a thermostatically controlled member releasing said carrier from said mechanism after a period determined by said mechanism and the temperature of said member and permitting quick further movement of said carrier to projected position.

PAUL J. McCULLOUGH.